May 3, 1932.  E. H. REMDE  1,856,082
INDUSTRIAL TRUCK
Filed July 24, 1929  4 Sheets-Sheet 1
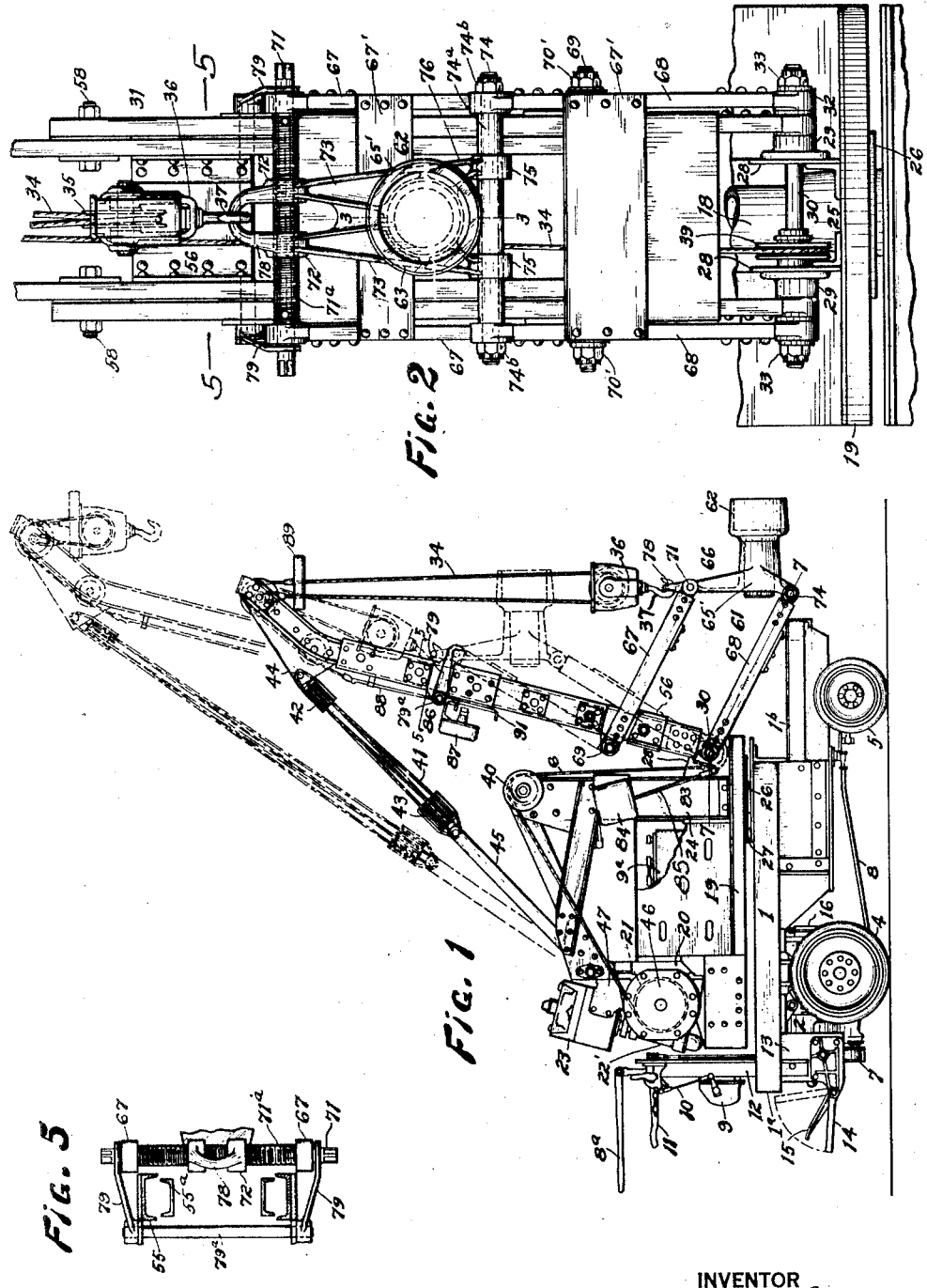
INVENTOR
Edward H. Remde.
BY Geo. B. Pitts
ATTORNEY May 3, 1932.　　　E. H. REMDE　　　1,856,082
INDUSTRIAL TRUCK
Filed July 24, 1929　　4 Sheets-Sheet 2
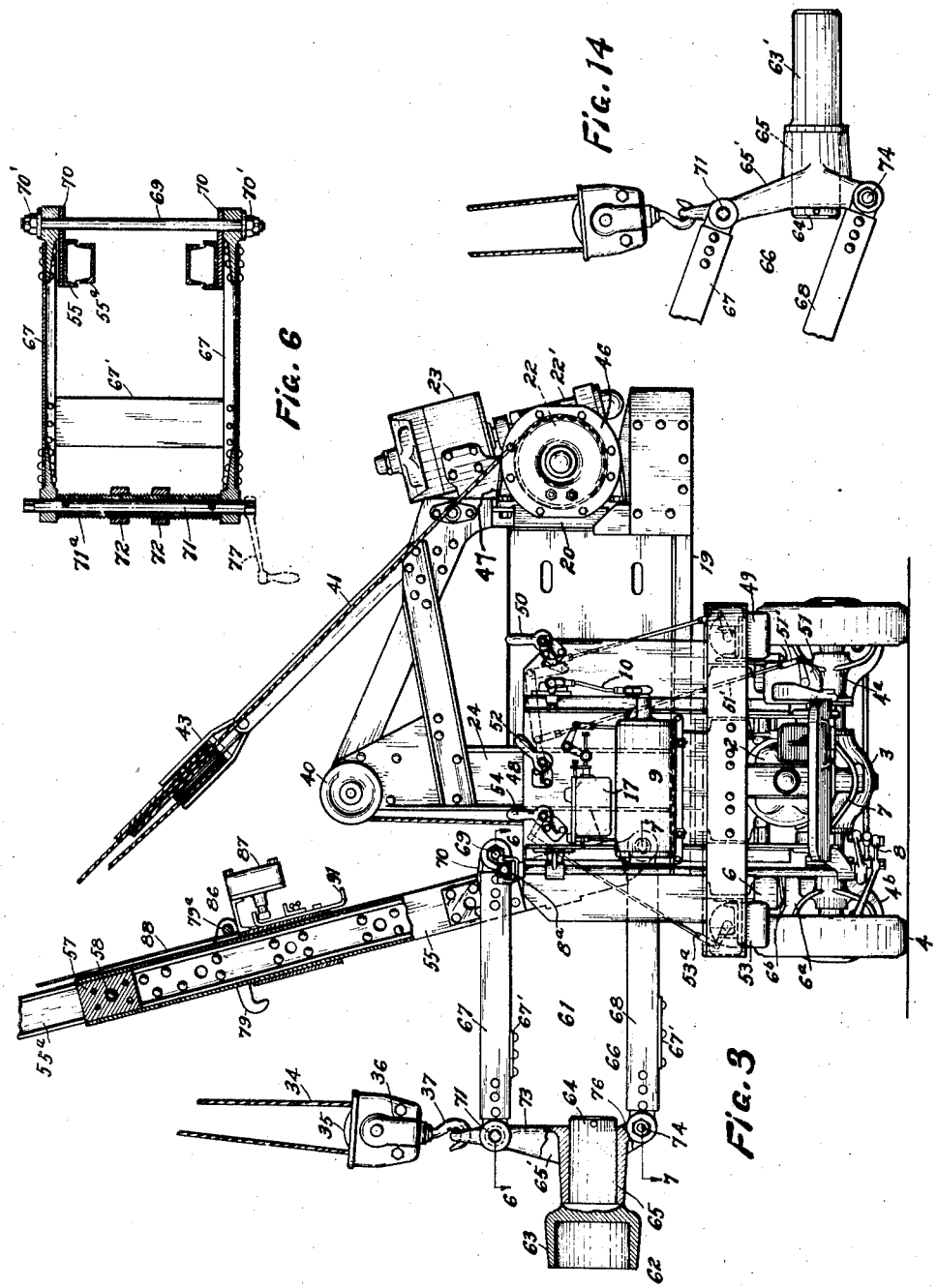
INVENTOR
Edward H. Remde
BY Geo. B. Pitts
ATTORNEY May 3, 1932.  E. H. REMDE  1,856,082
INDUSTRIAL TRUCK
Filed July 24, 1929  4 Sheets-Sheet 3
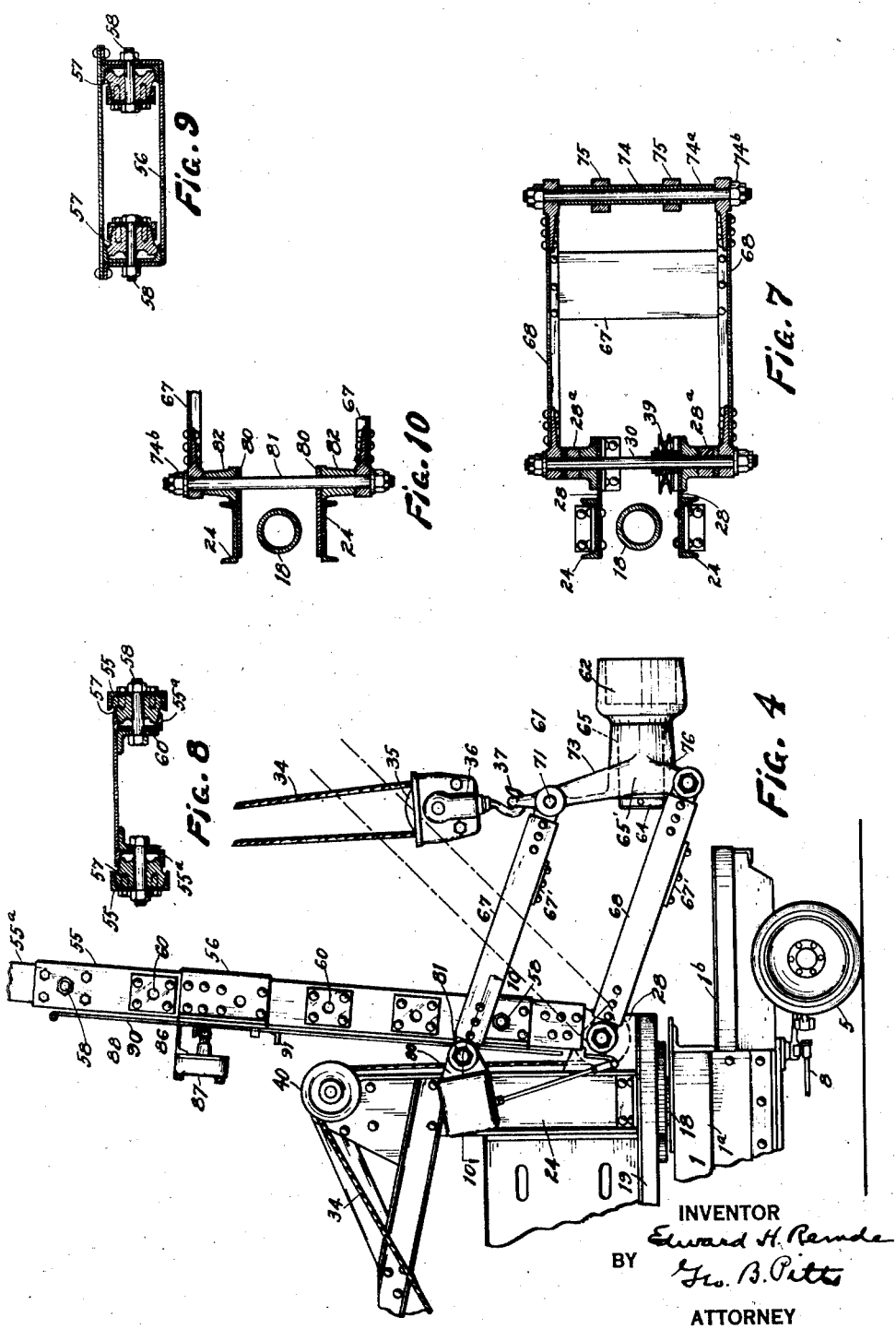

May 3, 1932.  E. H. REMDE  1,856,082
INDUSTRIAL TRUCK
Filed July 24, 1929   4 Sheets-Sheet 4
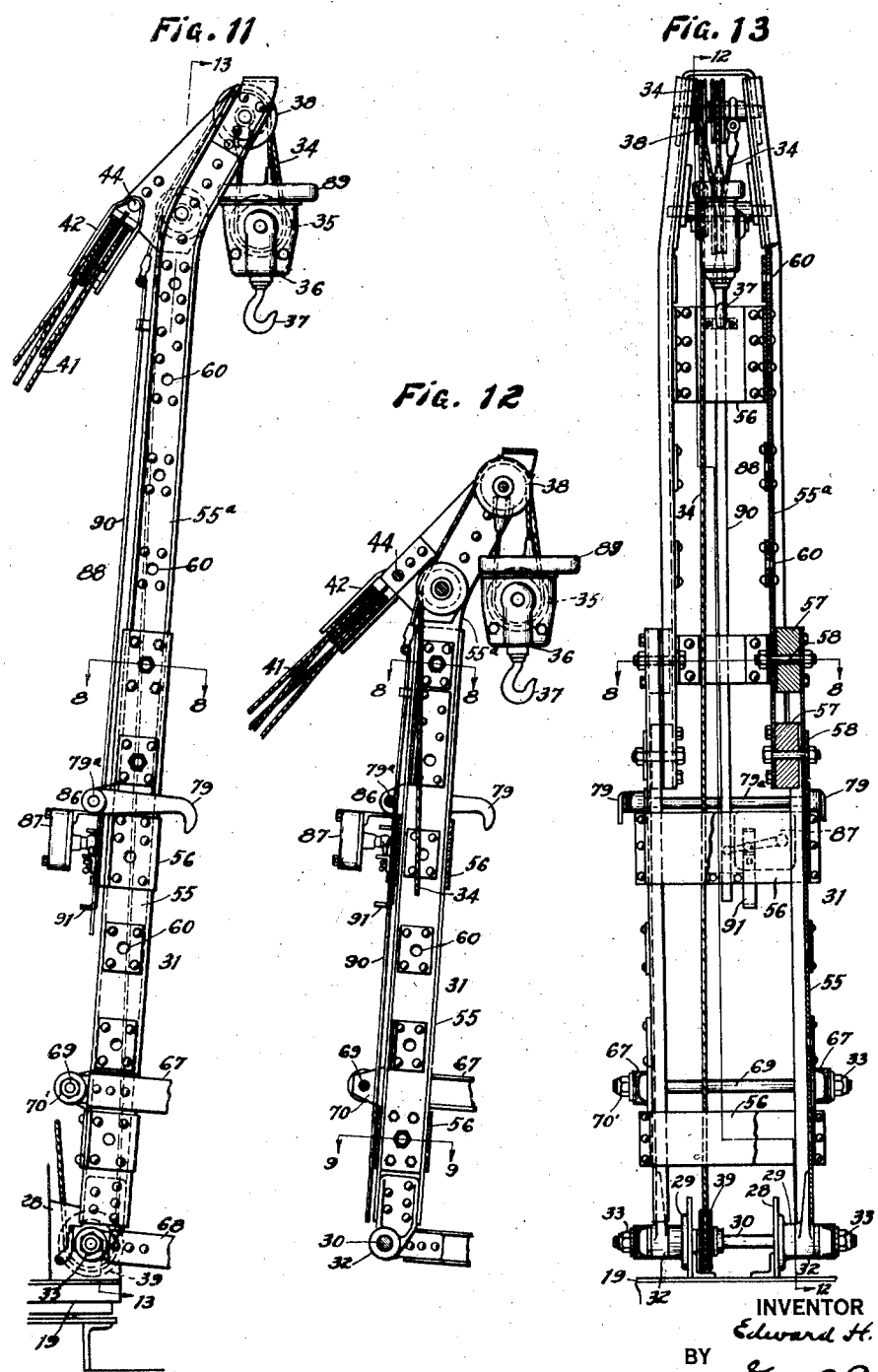
INVENTOR
Edward H. Remde
BY
Geo. B. Pitts
ATTORNEY Patented May 3, 1932

1,856,082

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed July 24, 1929. Serial No. 380,662.

This invention relates to an industrial truck provided with mechanism capable of carrying out a plurality of different operations.

One object of the invention is to provide an improved industrial truck having a plurality of load handling means supported, operated or controlled in an improved manner.

Another object of the invention is to provide a truck having a plurality of load handling mechanisms that are relatively simply and readily operated.

Other objects of the invention will be apparent to those skilled in the art to which my invention relates from the following description taken in connection with the accompanying drawings, wherein Fig. 1 is a side elevation of a truck embodying my invention.

Fig. 2 is a fragmentary end view somewhat enlarged, looking towards the left of Fig. 1, but showing certain parts in raised position.

Fig. 3 is a fragmentary elevation (partly in section on the line 3—3 of Fig. 2) looking towards the right of Fig. 1, but showing the boom carrying frame slewed to one of its operating positions.

Fig. 4 is a fragmentary side elevation showing a modified form of construction.

Fig. 5 is a section on the line 5—5 of Fig. 2.

Fig. 6 is a section on the line 6—6 of Fig. 3.

Fig. 7 is a section on the line 7—7 of Fig. 3.

Fig. 8 is a section on the line 8—8 of Fig. 11.

Fig. 9 is a section on the line 9—9 of Fig. 12.

Fig. 10 is a section on the line 10—10 of Fig. 4.

Fig. 11 is a fragmentary view showing the boom in side elevation with the boom sections in extended relation.

Fig. 12 is a section on the line 12—12 of Fig. 13, but showing the outer boom section adjusted to its innermost position.

Fig. 13 is a fragmentary view of the boom, partly in section on the line 13—13 of Fig. 11.

Fig. 14 is a fragmentary side elevation showing a slightly different form of construction.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement the wheels 4 serve as the traction wheels driven by the transmission mechanism.

4a indicates the axle for the wheels 4, terminating in suitable knuckles 4b. 6, 6a indicate seats carried by the frame section 1a and axle 4a for coiled springs 6b. 7 indicates a suspension mechanism for the motor 2 and housing 3 and comprising a pair of U-members. The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is connected by a linkage 10 to an operating lever 11, supported on an upright 12. 13 indicates brackets depending from the outer end of the frame section 1a and arranged to pivotally support a platform 14 for an operative. 15 indicates a foot pedal associated with the platform 14 and connected through a linkage to control a brake mechanism 16 which is normally biased into braking position by a spring as is customary in trucks of this general character. 17 indicates a switch mechanism which is connected to the foot pedal 15 or the linkage operated thereby to automatically open or close the motor circuit, the latter being open when the brake is set and closed when the brake is released by the pushing down of the foot pedal 15.

18 indicates a vertical shaft suitably mounted at its lower end on the frame section 1a. 19 indicates a frame swingably mounted at its front portion on the shaft 18. The frame 19 includes a base portion for supporting the batteries 9a, uprights 20 for supporting a pair of cable winding drums 21, 22, a power mechanism 22′ therefor and a motor 23 for the power mechanism and uprights 24 which support an upper bearing engaging the shaft 18 and cooperating with a bearing 25 at the front end of the base portion to rotatably support the frame 19 on the shaft. The frame 19 carries a gear 26 with which a pinion meshes, the pinion being fixed to a shaft 27 which is driven by a motor, supplied with current from the batteries 9a, the motor, its mounting and driving means being preferably similar to corresponding parts shown in my application Serial No. 679,605 filed December 10, 1923.

28 indicates standards mounted on the front end of the base portion of the frame 19 and provided with suitable bearings 29 for a shaft or pivot pin 30 serving as the pivot or fulcrum for a boom indicated as an entirety at 31. As shown, the pin 30 extends through suitable knuckles 32 on the lower end of the boom 31 and carries nuts 33 at its ends to hold the pin against endwise movement. 34 indicates a cable anchored at its outer end to the upper end portion of the boom 31 and depending downwardly to form a suspension loop which engages a sheave 35 mounted in a yoke 36. The yoke 36 carries a load engaging element, such as a hook 37. The other leg of the cable loop reeves over a sheave 38 suitably supported on the outer end of the boom 31. From the sheave 38, the cable 34 extends to and around a sheave 39 loosely mounted on the pin 30 and from the sheave 39 the cable extends to and around a sheave 40 suitably mounted on the adjacent upright 24 and from the latter sheave the cable extends to the winding and unwinding drum 21, the operation of which will serve to raise or lower the hook 37 depending on its direction of rotation.

41 indicates a cable connected at its inner end to and adapted to wind on and off the drum 22. The cable 41 is operatively connected to the upper portion of the boom 31 and operates to raise or lower the boom about its pivot pin 30 according to the direction of rotation of the drum 22. The cable 41 reeves through or around a pair of multi-type of pulley blocks 42, 43, the former being pivotally connected at 44 to the upper portion of the boom 31 and the latter being pivotally connected through a pair of links 45 to the frame 19.

The drums 21, 22, are mounted in suitable casings 46 fixed to a support 47 which carries the motor 23 and the power mechanism driven thereby, the support being fixed to the uprights 20. The drums are fixed to shaft sections connected to and driven by the power mechanism. The power mechanism is of the differential type, the ring gear of which is preferably a worm gear in mesh with a worm fixed to the shaft of the motor 23. Both drum shafts are normally locked against rotation by a separate clutch, either of which may be disconnected by a selective mechanism, indicated as an entirety at 48, so that upon the operation of the motor 23, the latter will transmit power through the differential mechanism to rotate the adjacent drum. By providing mechanism such as just described, either drum may be rotated at the will of the operative. 49 indicates a controller for the motor 23 arranged to close the circuit thereto to drive it in either direction. The shaft of the controller is connected by a suitable linkage to an operating handle 50. The means for disconnecting each clutch is preferably of the electro-magnetic type, for which reason the selective mechanism includes a suitable switch 51, which is connected by suitable linkage 51′ to a handle 52.

The construction of the drums 21, 22, power mechanism therefor, driving motor 23, clutches for holding the drums, the magnetic release means for the clutches and the selective mechanism forms the subject-matter of my said co-pending application Serial No. 679,605, for which reason no claims to this subject-matter are made herein.

By rotating either drum 21, 22, it will be seen that the boom 31 may be raised or lowered or the load engaging member 37 may be raised or lowered.

53 indicates a controller for the motor (not shown) which rotates the frame 19. The shaft of the controller 53 is connected by a linkage 53a to an operating handle 54.

The boom 31 preferably comprises inner and outer sections 55, 55a, respectively, the outer section being adjustable endwise on the inner section to increase or decrease the length of the boom 31, whereby it may be adapted to lift or discharge loads under varying conditions. Each boom section comprises a pair of channel bars connected in spaced relation by transverse members 56. The channels of the bars of the inner section are in opposed relation while the channels of the bars of the outer section are reversed and spaced within the planes of the bars of the innner section. In this arrangement each side bar of each section may overlap the adjacent bar of the other section to any desired extent depending on the adjustment of the outer section relative to the inner section and the channel of each side bar is disposed in opposed relation to the channel of the adjacent side bar so that they may receive a block 57, which may be clamped in wedging relation against the side walls or flanges of the channels to secure the sections in rigid relation in any position of adjustment, the blocks 57 having pairs of inclined walls forming wedges which engage the inner surfaces of the flanges on the opposed channels, as shown in Figs. 8 and 9. 58 indicates removable bolts which extend through aligned openings 60 in each pair of related channels and the adjacent blocks to clamp them together with the wedge blocks between them. I prefer to provide a pair of clamping devices for each pair of related channels (see Fig. 13) to insure rigidity. I provide the channels with a series of openings 60, preferably uniformly spaced, so that two openings in each channel will align with two openings in the adjacent channel in any position of adjustment of the outer boom section 55a. By preference, in any position of adjustment of the outer section 55a, the outer clamping devices are arranged near the outer end of the inner section 55 and the inner clamping devices are arranged near the inner end of the outer section 55a.

61 indicates as an entirety a separate mechanism for engaging, lifting and transporting a load. The load engaging and carrying member forming an element of this mechanism may be shaped or constructed to engage, lift and carry any desired type of load, but in the illustrated form of construction it is adapted to engage one end of a body, such as a roll (not shown) for a rolling mill, and lift it, whereby such roll may be disengaged from its supporting bearings or other supporting means and conveyed away, or picked up and conveyed to and discharged upon its supporting bearings. In the form of construction illustrated in Figs. 1 to 13, the load engaging member, indicated at 62, is provided with a hollow head 63 which telescopes over the end of the roll, when the truck is driven forwardly, to engage it, and has a shank 64 removably fitting an opening 65 formed in a support 65' forming part of a mounting indicated as an entirety at 66. Where the body end is of irregular shape, the inner wall of the head 63 may be correspondingly shaped; and in such form of construction the shank 64 may be adjusted rotatively in the opening 65 to align the head with the body end. Where the body to be engaged and transported is formed with an opening the head may consist of an outwardly projecting device, as shown at 63' (Fig. 14) adapted to be projected into such opening. The mounting 66 may be connected to the boom 31 whereby the swinging of the latter about its pivot pin 30 will adjust the member 62 at an inclination to the plane of the truck frame to position it in engaging relation to the body or roll, particularly where the floor for the truck and the body or roll support are not on a level or levels parallel to each other or other unevenness exists, this form of mounting being shown in Figs. 1, 2, 3, 11, 12 and 13; or the mounting may be otherwise supported, as shown in Figs. 4 and 10. In both forms of construction, the mounting is so related to the load engaging member 37 that operation of the latter may be utilized to support and adjust the load engaging member 62 upwardly or downwardly to position the latter into engaging relation to the roll to be engaged, and transported, as well as lifted or lowered where such movement is required. Furthermore, in both forms of mounting the load engaging member may be adjusted laterally relative to the longitudinal center of the truck frame so that by its adjustment either laterally or vertically or in both directions it may be arranged in load engaging position without requiring the shifting of the truck.

Referring to Figs. 1, 2, 3, 6, 7, 11, 12 and 13, the mounting 66 comprises pairs of parallel links 67—67, 68—68, the inner ends of the links 67 being pivotally connected to a transverse shaft 69 supported at its opposite ends by a pair of plates 70 which are secured to and extend rearwardly from the channels of the inner boom section 55, the shaft 69 being provided with nuts 70' on its ends to prevent its endwise movement. The outer ends of the links 67 are pivotally connected to a shaft 71, which extends through knuckles 72 provided on a pair of arms 73 extending upwardly and forming part of the support 65'. The inner ends of the links 68 are preferably pivotally mounted on the pivot pin 30, suitable spacers 28a being provided on the shaft 30 between the links and the brackets 28 (see Fig. 7); whereas their outer ends are pivotally connected to a shaft 74, which extends through a pair of knuckles 75 provided on a pair of arms 76 extending downwardly from and forming part of the support 65'. The shaft 74 is provided with a sleeve 74a which serves to space the outer ends of the links and permits nuts 74b to be tightened on the shaft ends against the links. The sleeve 74a loosely fits the knuckles 75 so that the latter may rotate and slide on the sleeve 74a. Each pair of links 67—67, 68—68, may be connected together by a cross piece 67'. The support 65' consists of a casting having a body portion to which the arms 73 and 76 are integrally connected, the body portion being formed with the opening 65 through which the shank 64 of the member 62 extends. The shank 64 may be keyed or otherwise fixed against rotation in the opening 65 if desired and its inner end may be provided with a cotter pin to removably hold it in the opening.

The shaft 71 is preferably provided with a threaded sleeve 71a fixed thereto and this sleeve extends through the knuckles 72, which are also threaded, so that upon rotation of the shaft, the support 65' will be adjusted laterally according to the direction of rotation of the shaft. When the support 65' is adjusted laterally, the knuckles 75 slide on the sleeve shaft 74a. To effect rotation of the shaft 71, either or both ends may be shaped to take a suitable tool, such as a crank 77 (see dotted lines in Fig. 6). As shown in Fig. 6, the ends of the sleeve 71a abut the inner sides of the links 67 to prevent endwise movement of the shaft 71.

78 indicates a loop extending upwardly from the knuckles 72 and arranged to be engaged by the hook 37 to hold the mounting in any desired position when the load handling mechanism 61 is to be used. By raising or lowering the hook 37, the load engaging member 62 may be adjusted vertically to the desired position, being limited downwardly by the engagement of the links 68 with the outer end of the frame section 1b. When the mechanism 61 is not to be used, it may be raised to an in-operative position, as shown in dotted lines in Fig. 1, in which position it may be engaged by a hook 79 pivotally mounted on the boom 31, and held in such position. If desired, I may provide a hook 79 at either side of the boom, these hooks being carried by the boom section 55. A single shaft 79a may be provided to form a pivot for the hooks 79. When the mechanism 61 is in its inoperative position, the load engaging member 37 and boom 31 may be operated in the usual manner.

Referring to Figs. 4 and 10, the mounting for the load engaging member 62 is similar to the mounting already described except that the upper pair of links 67 are pivotally mounted on or connected to the frame 19. In this form of construction, it will be noted that the uprights 24 are provided with outwardly extending brackets 80, which support a shaft 81 and that the links 67 are pivotally connected to this shaft, spacers 82 being provided on the shaft between each bracket and the adjacent link.

Where the links 67 are connected to the frame 19, as just described, the load engaging member is not adjustable to an inclination to the plane of the truck frame to compensate for unevenness of the flooring.

It will be noted that the separate load handling mechanism 61 is mounted on the frame 19 and therefore is disposed in cooperative relation to the hook 37 in any position to which the frame 19 may be slewed; also, by arranging this mechanism in such relation, a single motor 23 is required to operate the boom 31 about its pivot, raise or lower the hook 37 and raise or lower the load engaging member 62.

83 indicates a limit switch mechanism operable to break the motor circuit, when the boom swings to a predetermined position in either direction, suitable switches being mounted within a casing 84 mounted on one of the uprights 24 and operated by a rod 85 pivotally connected to an adjacent portion of the boom 31.

86 indicates a limit switch mechanism operable to break the motor circuit, when the yoke 36 is raised to a predetermined position, a suitable switch being mounted within a casing 87 and operated by connections 88 leading to and connected to a weight 89 disposed in the path of movement of the yoke 36 or the housing carried thereby. As shown, the switch casing is mounted on the boom section 55, and the connections 88 include a rod 90 to which is adjustably secured an operating device 91 which actuates the switch. Accordingly, when the boom section 55a is adjusted relative to the section 55, the device 91 is adjusted on the rod 90 so as to retain the device in operative relation to the switch.

To those skilled in the art to which my invention relates, many changes in construction and widely differing embodiments and applications of the invention will suggest themselves without departing from the spirit and scope of the invention. My disclosures herein, and the description are purely illustrative and are not intended to be in any sense limiting.

What I claim is:

1. In apparatus of the class described, the combination of a wheel mounted frame, a pair of parallel links pivotally mounted at their inner ends on said frame, a support to which the outer ends of said links are connected, a load engaging member carried by said support, means for moving one of said links endwise to adjust said load engaging member at an inclination to the plane of said frame, and means for swinging said links upwardly or downwardly.

2. In apparatus of the class described, the combination of a wheel mounted frame, a pair of parallel links pivotally mounted at their inner ends on said frame, a support to which the outer ends of said links are connected, a load engaging member carried by said support, means for adjusting said support laterally, means for moving one of said links endwise to adjust said load engaging member at an inclination to the plane of said frame, and means for swinging said links upwardly or downwardly.

3. In apparatus of the class described, the combination of a wheel mounted frame, a boom pivotally mounted thereon, a load engaging member, a cable depending from the outer portion of said boom and supporting said member, means for winding up and paying out said cable to raise or lower said member, a separate load carrying member having an element adapted to be engaged by said first mentioned member for raising or lowering it, a pair of lower links pivotally connected at their outer ends to said separate load carrying member and pivotally connected at their inner ends to said frame, a pair of upper links disposed upon opposite sides of said boom above the pivot therefor and pivotally connected at their outer ends to said separate load carrying member, and means for pivotally supporting the inner ends of said upper pair of links above the pivot for said boom.

4. In apparatus of the class described, the combination of a wheel mounted frame, a boom pivotally mounted thereon, a load engaging member, a cable depending from the outer portion of said boom and supporting said member, means for winding up and paying out said cable to raise or lower said member, a separate load handling mechanism comprising a mounting swingably supported below and in operative relation to said load engaging member and arranged to be engaged by said member to raise and lower said mounting and a load engaging member carried by said mounting, and means for detachably connecting said mounting to said boom to hold said mechanism in an in-operative position.

5. In apparatus of the class described, the combination of a wheel mounted frame, a boom pivotally mounted thereon, a load engaging member, a cable depending from the outer portion of said boom and supporting said member, means for winding up or paying out said cable to raise or lower said member, a pair of upper and lower parallel links, said lower link being pivoted at its inner end on said frame on an axis coincident with the axis of the boom pivot and said upper link being pivoted to said boom, a support, to which the outer ends of said links are pivoted, arranged to be detachably engaged by said load engaging member to swing said links and support upwardly or downwardly, a load engaging member carried by said support, and means for swinging said boom about its pivot.

6. In apparatus of the class described, the combination of a wheel mounted frame, a boom pivotally mounted thereon, a load engaging member, a cable depending from the outer portion of said boom and supporting said member, means for winding up or paying out said cable to raise or lower said member, a pair of upper and lower parallel links, said lower link being pivoted at its inner end on said frame on an axis co-incident with the axis of the boom pivot and said upper link being pivoted to said boom, a support, to which the outer ends of said links are pivoted, arranged to be detachably engaged by said load engaging member to swing said links and support upwardly or downwardly, a load engaging member carried by said support, means for swinging said boom about its pivot, and means for adjusting said support relative to said links laterally.

7. In apparatus of the class described, the combination of a wheel mounted frame, a boom pivotally mounted thereon, a load engaging member, a cable depending from the outer portion of said boom and supporting said member, means for winding up or paying out said cable to raise or lower said member, a pair of upper and lower parallel links, said lower link being pivoted at its inner end on said frame on an axis co-incident with the axis of the boom pivot and said upper link being pivoted to said boom, a support, to which the outer ends of said links are pivoted, arranged to be detachably engaged by said load engaging member to swing said links and support upwardly or downwardly, a load engaging member rotatably carried by said support, and means for swinging said boom about its pivot.

8. In apparatus of the class described, the combination of a wheel mounted frame, a boom pivotally mounted thereon, a load engaging member, a cable depending from the outer portion of said boom and supporting said member, means for winding up or paying out said cable to raise and lower said member, a pair of upper and lower parallel links, said lower link being pivoted at its inner end on said frame on an axis coincident with the axis of the boom pivot and said upper link being pivoted to said boom, a support, to which the outer ends of said links are pivoted, and arranged to be detachably engaged by said load engaging member to swing said links and support upwardly or downwardly, a load engaging member removably carried by said support, and means for swinging said boom about its pivot.

9. In apparatus of the class described, the combination of a wheel mounted frame, a boom pivotally mounted thereon, a load carrying member, a cable depending from the outer portion of said boom and supporting said member, means for winding up and paying out said cable to raise or lower said member, a separate load carrying member having an element adapted to be engaged by said first mentioned member for raising or lowering it, a pair of lower links pivotally connected at their outer ends to said separate load carrying member and pivotally connected at their inner ends to said frame, a pair of upper links disposed upon opposite sides of said boom above the pivot therefor and pivotally connected at their outer ends to said separate load carrying member, and means for pivotally supporting the inner ends of said upper pair of links on said frame above the pivot for said boom.

In testimony whereof, I have hereunto signed my name.

EDWARD H. REMDE.